United States Patent
Oakes

(10) Patent No.: US 10,171,670 B1
(45) Date of Patent: Jan. 1, 2019

(54) SYSTEMS AND METHODS FOR LOCATION BASED CALL ROUTING

(71) Applicant: UNITED SERVICES AUTOMOBILE ASSOCIATION, San Antonio, TX (US)

(72) Inventor: Charles Lee Oakes, Boeme, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 126 days.

(21) Appl. No.: 15/237,533

(22) Filed: Aug. 15, 2016

Related U.S. Application Data

(63) Continuation of application No. 12/061,324, filed on Apr. 2, 2008, now Pat. No. 9,426,293.

(51) Int. Cl.
  *H04M 3/42* (2006.01)
  *G06F 17/00* (2006.01)
  *H04M 3/523* (2006.01)
  *G06Q 40/08* (2012.01)

(52) U.S. Cl.
  CPC .......... *H04M 3/5235* (2013.01); *G06Q 40/08* (2013.01); *H04M 3/42348* (2013.01); *H04M 2203/2011* (2013.01)

(58) Field of Classification Search
  CPC . H04M 3/523; H04M 3/51; H04M 2203/2011
  USPC ..................................................... 379/265.02
  See application file for complete search history.

(56) References Cited

U.S. PATENT DOCUMENTS

| | | |
|---|---|---|
| 6,424,840 B1 | 7/2002 | Fitch et al. |
| 6,642,844 B2 | 11/2003 | Montague |
| 6,694,234 B2 | 2/2004 | Lockwood et al. |
| 6,819,929 B2 | 11/2004 | Antonucci et al. |
| 7,058,594 B2 | 6/2006 | Stewart |
| 7,177,397 B2 | 2/2007 | McCalmont et al. |

(Continued)

OTHER PUBLICATIONS

United States Notice of Allowance issued in U.S. Appl. No. 12/061,324 dated Jun. 29, 2016.

(Continued)

*Primary Examiner* — Ahmad F. Matar
*Assistant Examiner* — Jirapon Intavong
(74) *Attorney, Agent, or Firm* — Eric L. Sophir; Dentons US LLP

(57) ABSTRACT

Disclosed herein are a system, method, and computer-readable medium with instructions for recommending a service provider based on a user's approximate current location. The service provider may be recommended for a service that is verified under a user's insurance policy and is also within proximity to the user's approximate current location. The user's approximate current location may be determined by location-based technology. The entity that receives and/or recommends the service provider may initiate a request for the service from the service provider. Further embodiments are related to routing a call to provide information to the user that is responsive to the user's location-relevant request. For example, systems, such as an automotive telematics system, may request information and be routed to the appropriate division of a user's insurance provider such that the automotive telematics system can provide services to the user that are user-specific (e.g., covered by the user's insurance policy).

18 Claims, 8 Drawing Sheets

(56) References Cited

U.S. PATENT DOCUMENTS

| | | | |
|---|---|---|---|
| 7,177,623 | B2 | 2/2007 | Baldwin |
| 7,657,368 | B2 | 2/2010 | Weiss et al. |
| 7,711,475 | B1 | 5/2010 | Cona et al. |
| 8,060,500 | B1 | 11/2011 | Fitch et al. |
| 2002/0103622 | A1 | 8/2002 | Burge |
| 2002/0107029 | A1 | 8/2002 | Caughran et al. |
| 2003/0088347 | A1 | 5/2003 | Ames |
| 2003/0109245 | A1 | 6/2003 | McCalmont et al. |
| 2003/0158760 | A1 | 8/2003 | Kannenberg |
| 2003/0216960 | A1 | 11/2003 | Postrel |
| 2004/0161097 | A1* | 8/2004 | Henry .................. G06Q 10/02 379/266.02 |
| 2005/0053209 | A1 | 3/2005 | D'Evelyn et al. |
| 2007/0021981 | A1 | 1/2007 | Cox |
| 2007/0032247 | A1 | 2/2007 | Shaffer et al. |
| 2007/0038476 | A1 | 2/2007 | Sternlicht |
| 2007/0061363 | A1 | 3/2007 | Ramer et al. |
| 2007/0192116 | A1 | 8/2007 | Lovitt |
| 2008/0065726 | A1 | 3/2008 | Schoenberg |
| 2008/0086219 | A1 | 4/2008 | Evans et al. |
| 2008/0119203 | A1 | 5/2008 | Shalmon et al. |
| 2008/0172258 | A1 | 7/2008 | Weger et al. |

OTHER PUBLICATIONS

United States Final Office Action issued in U.S. Appl. No. 12/061,324 dated Jul. 29, 2015.
United States Non-Final Office Action issued in U.S. Appl. No. 12/061,324 dated Nov. 4, 2014.
United States Non-Final Office Action issued in U.S. Appl. No. 12/061,324 dated Mar. 27, 2014.
United States Final Office Action issued in U.S. Appl. No. 12/061,324 dated Nov. 6, 2013.
United States Non-Final Office Action issued in U.S. Appl. No. 12/061,324 dated Apr. 11, 2013.
United States Final Office Action issued in U.S. Appl. No. 12/061,324 dated Feb. 1, 2012.
United States Non-Final Office Action issued in U.S. Appl. No. 12/061,324 dated Aug. 9, 2011.
Telematics: safe and fun driving: (pp. 4-8) [Retrieved on Feb. 8, 2008]. Retrieved from the Internet URL: http://ewh.ieee.org/tc/its/newsletters/v4n2.pdf> 29 pages.
United States Non-Final Office Action issued in U.S. Appl. No. 12/061,316 dated Mar. 31, 2011.
United States Notice of Allowance issued in U.S. Appl. No. 12/061,336 dated Jun. 21, 2011.
United States Non-Final Office Action issued in U.S. Appl. No. 12/061,336 dated Jan. 12, 2011.

* cited by examiner

SYSTEMS AND METHODS FOR LOCATION BASED CALL ROUTING

CROSS-REFERENCES TO RELATED APPLICATIONS

This application is a continuation application of U.S. patent application Ser. No. 12/061,324, filed Apr. 2, 2008, which is incorporated by reference herein in its entirety. This application is related by subject matter to the embodiments disclosed in the following commonly assigned applications: U.S. patent application Ser. No. 12/061,316 and U.S. patent application Ser. No. 12/061,336, now U.S. Pat. No. 8,036,160 issued Oct. 11, 2011, each filed on Apr. 2, 2008 and each entitled "Systems and Methods for Location Based Call Routing." The disclosure of each application is incorporated by reference herein in its entirety.

BACKGROUND

A service provider may provide services to a client based on need. For example, automotive telematic systems currently provide location-based services for vehicles over a wireless telecommunications network. Typically, the system instantly connects vehicle occupants to a service provider for roadside services, for example, while automatically reporting the vehicle position. An automotive telematic system uses a cellular phone for voice and data communications and an onboard global positioning system receiver for positioning. Typically, the automotive telematics systems are activated manually by the user pushing a button or, alternatively, the system can activate automatically when one of the vehicle's safety sensors detects an emergency event, for example. Activation of the system results in a connection to a service provider and the user may be connected to a service provider advisor. These call centers may initiate need-specific services depending on the needs of the user (e.g., roadside assistance, unlocking doors remotely).

Many companies operate customer service call centers where customers can call for information, product support or to initiate a transaction. Typically, these customer service providers operate as a call center or centralized office that answers incoming telephone calls from customers. In a call center the call is then typically answered by a telephone system known as an automatic call distributor (ACD) or private branch exchange (PBX). Subsequent routing of the calls is determined by the call center. In telephone systems, an Automatic Call Distributor (ACD) is a device or system that may route incoming calls to a specific agent. The routing strategy is usually a rule-based set of instructions that tells the ACD how calls should be handled, often based on the user's automatic number identification (ANI).

The ANI is a feature of telephony intelligent network services that permits subscribers to display or capture the telephone numbers of calling parties. The ANI is similar to the use of a calling number identification system (caller ID) that transmits a callers number to the called party's telephone equipment during the ringing signal. Based on the location linked to the party's telephone number, the caller may be routed to a unique location-relevant service provider. However, the ANI locates a static location and doesn't identify the location of a mobile location based on a mobile telephone number (e.g., cell phone number).

SUMMARY

Accordingly, a system, method, and computer-readable medium with instructions are disclosed for recommending a service provider based on a user's approximate current location. The service provider may be recommended for a service that is verified under a user's insurance policy. The entity that receives and/or recommends the service provider may initiate a request for the service from the service provider. Further embodiments are related to routing a call from a user to provide information to the user that is responsive to the user's location-relevant request. Systems, such as an automotive telematics system, may request information and be routed by a call center for the user's insurance provider such that the automotive telematics system can provide services to the user that are user-specific (e.g., covered by the user's insurance policy).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The subject matter of the disclosed embodiments is described with specificity to meet statutory requirements. However, the description itself is not intended to limit the scope of this patent. Rather, the claimed subject matter might also be embodied in other ways, to include elements similar to the ones described in this document in conjunction with other present or future technologies. Embodiments are related to providing services to a mobile user that are linked to the user's approximate current location.

It would be desirable that the services initiated on behalf of the user, such as by an automated telematics system, were user-specific such that the services initiated correspond to the user's insurance policies and are available under and/or covered by the user's insurance policy. It would be desirable that call centers could route incoming calls based on a user's approximate current location. For example, it would be desirable that any requests from a service provider to a user's insurance provider are routed to the proper destination based on the user's need and the user's approximate current location.

Figure 1:
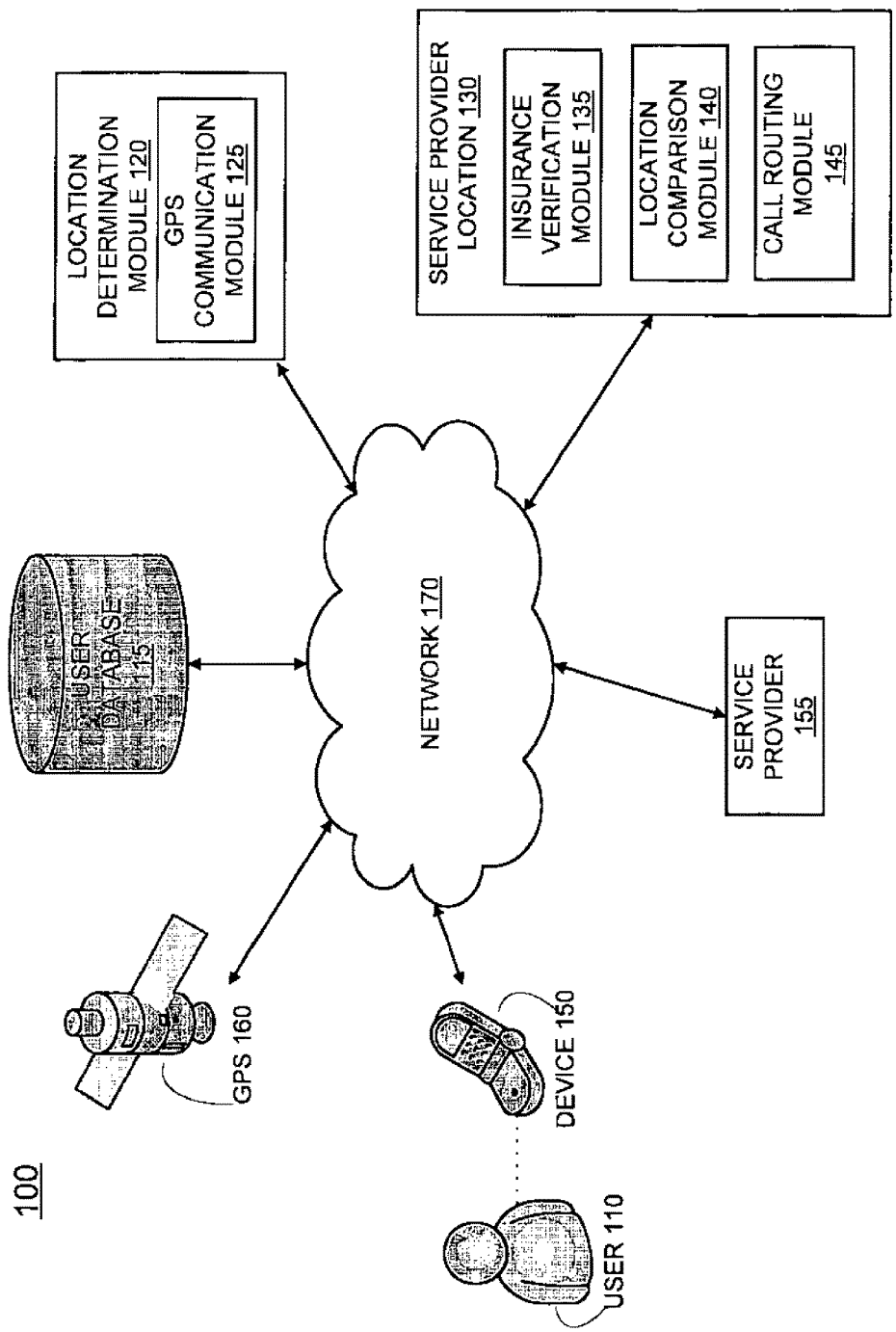
FIG. 1 depicts an example system configured to verify services under a user's insurance policy and recommend service providers.

FIG. 1 illustrates an example system 100 in which aspects of the techniques described herein may be employed. System 100 may include user 110, device 150, global positioning system (GPS) 160, a user database 115, a location determination module 120, an insurance verification module 135, a location comparison module 140, a service provider 155, and a call routing module 145. User 110, device 150, global positioning system (GPS) 160, a user database 115, a location determination module 120, an insurance verification module 135, a location comparison module 140, a service provider 155, and a call routing module 145 may communicate with one another by way of network 170, such as a communications network.

The network 170 may include, for example, an intranet, the Internet, a local area network (LAN), a wide area network (WAN), a public switched telephone network (PSTN), a cellular network, a voice over internet protocol (VoIP) network, and the like, for example. The user 110 may communicate with location determination module 120 through device 150 over the network, for example. Device 150 may be a wired or wireless phone, a computer, a facsimile machine, an imbedded chip, a watch, or a personal digital assistant (PDA), for example. Device 150 may include a receiver, such as, for example, a GPS receiver for receiving GPS information, such as coordinate and time information, related to device 150.

Location determination module 120 may employ device 150 associated with user 110 and GPS 160 to assist in a location determination process. The device 150 that is associated with the user 110 may receive information from and provide information to location determination module 120. GPS communication module 125 may communicate with GPS 160 to obtain the GPS information of device 150. GPS information may include a timestamp with the longitude and latitude coordinates of device 150. Alternately, the location may be in the form of an address, with a street number, city, and state, for example. Location determination module 120 may provide the determined location to the user database 115.

Location information pertaining to the user 110 may be received from a variety of types of position determining equipment having different underlying technologies, such as: GPS (Global Positioning System); angle of arrival (AOA); time difference of arrival (TDOA); Line of Sight (LOS); etc. FIG. 1 shows the use of GPS 160 to assist in the determination of the location of device 150 associated with user 110. For example, GPS 160 may include multiple satellites that orbit above the Earth. The GPS satellites may each contain a computer, an atomic clock, and a radio, operating to continuously broadcast its changing position and time. A GPS receiver, such as the receiver in device 150, may contain a computer or processing unit operating to calculate the position of the GPS receiver through receipt of time signals. The position may be calculated from three satellites through a process called trilateration or through a process called triangulation, for example. The position may be provided in the form of a longitude and latitude. The GPS receiver may further calculate altitude, speed of travel, and direction of travel.

User 110 may have a subscription to or otherwise have access to a service provider 155. The service provider 155 may be an entity that monitors a user's status and serves as a central unit for accessing services needed by the user. The service provider 155 may be a customer support center that communicates with the user. The service provider 155 may field inquiries from the user, provide consulting advice, and request services to meet a user's needs. For example, the service provider 155 could be an automotive service provider 155 that communicates with the user to inform the user that the user's car needs servicing and initiate a request for service if authorized by the user.

The service provider location 130 may include modules for insurance verification 135, location comparison 140, and call routing 145. The service provider location 130 may be the location of a service provider that can perform a requested service on behalf of the user based on the user's insurance policy and the user's approximate current location. The call routing module 145 may provide more efficient access to an appropriate insurance provider.

The insurance verification module 135 may process a request for service for a particular user, such as a request received from the service provider 155. A user may be an insured user and the user's insurance provider may use the insurance verification module 135 to verify that the insured's insurance policy covers a requested service. The insurance verification module 135 may identify the user and compare the user's requested service to the user's insurance policy. If the service requested is one that is covered by the user's insurance policy, the requested serviced may be verified.

The location comparison module 140 may identify service providers that perform a requested service. The location comparison module 140 may utilize the user's approximate current location determined by the location determination module 120. If a service provider is within a certain range of the user, for example, the service provider may be a recommended service provider. In combination with the insurance verification module 135, the location comparison module 140 may identify a service provider that is also one that provides a service verified by the insurance verification module 135. The service provider may be one that can be paid or applied as a contracted service through the insurer, where the action is dictated by the insurance policy. A recommendation for the service provider may be sent to the user or the service provider 155, for example, over the network 170. If the user calls from a location that is identified to be a merchant, for example, the user is at a service provider's location, the insurance verification module 135 may identify the service provider. The insurance verification module 135 may use the identification to determine if the service provider provides any services that are covered by the user's insurance policy or covered in any current agreements with the insurer.

The call routing module 145 may provide more efficient access to a representative within a host service that a user may communicate with over a communication channel. The host may include a plurality of nodes. For example, an insurance provider may host multiple nodes, where each node represents a different category of insurance (e.g., car insurance, life insurance, business insurance, etc). A user may access the insurance provider over a communications channel and be routed to an appropriate node. Depending on the user's approximate current location and type of information that the user is seeking, the user may be routed to one of the multiple nodes. For example, if the user is in a car accident and connects to the hosting insurance provider via the communications channel, the user may be routed directly to a car insurance agent that is located in proximity to the user's approximate current location. The user may call a specific number that handles car insurance claims and be routed to the closest insurance agent. Alternately, the user could call an insurance provider and provide input as to the reason for the call, and then based on the user's reasons for calling and the user's approximate current location, the call is routed to a particular node.

The user database 115 may be any form of data storage, including a storage module, device, or memory, for example. The user database 115 may be provided as a database management system, an object-oriented database management system, a relational database management system (e.g. DB2, Access, etc), a file system, or another conventional database package. Further, the databases can be accessed via a Structure Query Language (SQL), or other tools known to one of ordinary skill in the art.

The user database 115 may contain an inventory of user information, such as a structured collection of records and/or data associated with the user. User database 115 may operate to store multiple user identifiers, where each user identifier is associated with a user 110. A user identifier may include information related to the user 110 and a device 150 associated with the user. A user identifier associated with user 110 may include an identification given to user 110 which may be, for example, a randomly generated character and/or number string or a name of user 110, and information related to device 150 associated with user 110, such as, for example, a mobile phone number. The user identifier may be encrypted to ensure the privacy of the user.

The information in the user database 115 may be structured to enable a person or program to extract desired information to share information about the user. For example, if the insurance verification module 135 stores information in the user database 115 that identifies the user's insurance information, the service provider 155 may have access to such information to better provide services to an insured. An entity such as the location determination module 120 or insurance verification module 135 may maintain and update the user database 115. For example, the service provider 155, insurance verification module 135, and location determination module 120 may store a log of requested service, the user's insurance agent, and GPS information related to a user.

Figure 2:
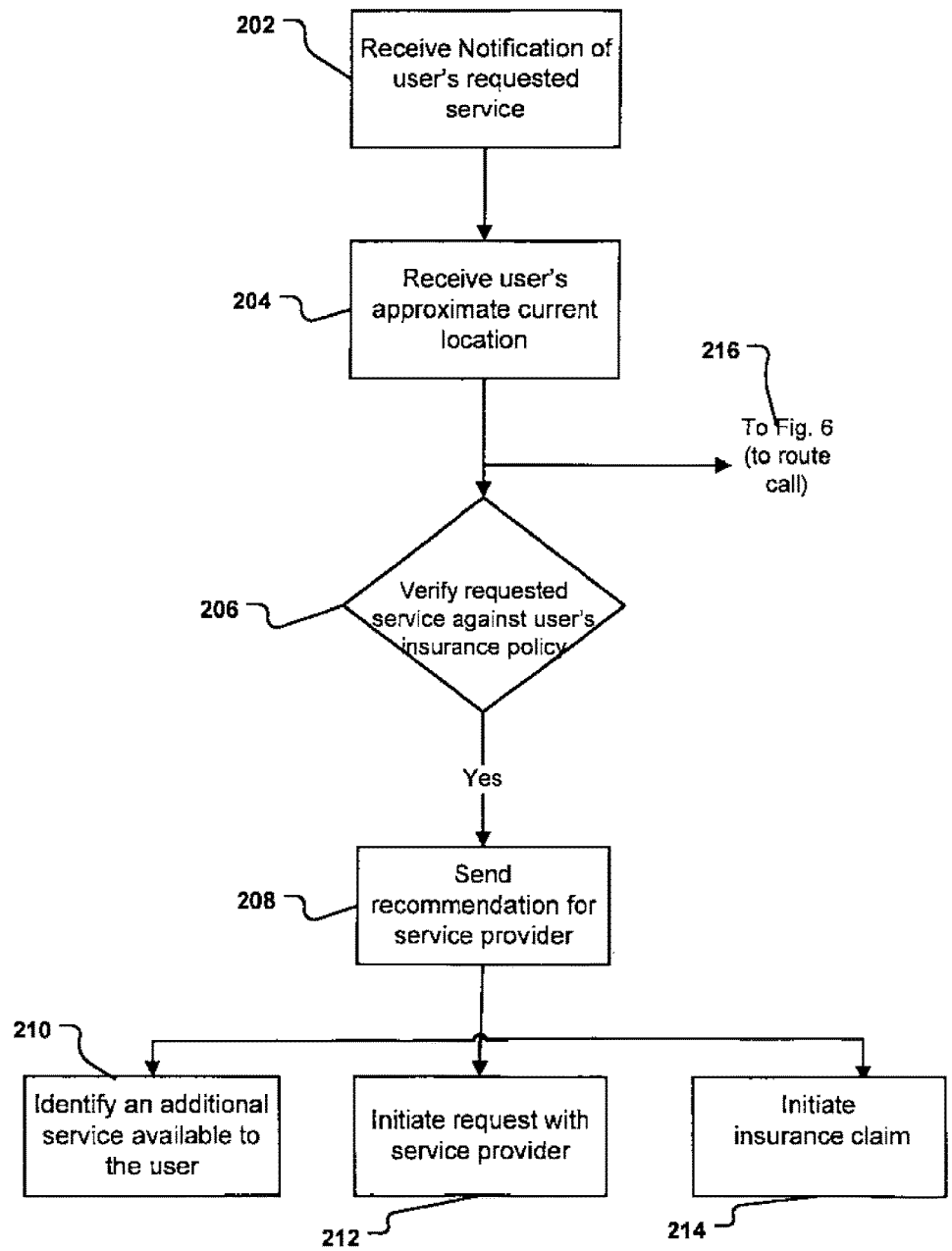
FIG. 2 depicts an example method of sending a recommendation for a service provider to a user.

FIG. 2 depicts an example method of sending a recommendation for a service provider to a user, where the recommendation is based on both a verified service requested for the user and the user's approximate current location. At 202, an entity such as an insurance provider may receive a notification that a user is requesting a particular service. The service may be one that is covered by an insurance policy. Thus, the user may wish to know if the service is covered by insurance before the user requests the service. At 204, the entity may receive the user's approximate current location. Thus, if a service is verified, the user's approximate current location may be used to identify a service provider in proximity to the user. Based on the notification of the requested service at 202 and the user's approximate current location at 204, a call to the insurance provider may be routed for more efficient processing of the request at 216. The routing of a call is described in more detail with respect to FIG. 6.

At 206, the entity may verify that a requested service is covered by an insured's policy. If the service is covered, the entity may send a recommendation at 208 for a service provider that is within proximity to the user. The insurance provider may locate a preferred service provider, such as a service provider that could provide the user with savings. For example, car insurance providers typically use preferred auto body shops and may receive premium rates on behalf of the user if the user uses them.

In addition, because an insurance provider may provide policies that cover risks in more than one category, an insurance provider may identify additional services that are covered by the insured's policy that may be related to the requested service at 210. For example, auto insurance typically covers both property risk and liability risk. A homeowner's insurance policy typically includes property insurance covering damage to the home and the owner's belongings and sometimes health insurance for guests on the insured's property. In addition, the insurance provider may be both the provider for a user's auto insurance and health insurance and identify additional services beyond those requested at 202. At 212, the entity may initiate a request with a recommended service provider. And, at 214, the insurance provider may initiate an insurance claim.

Figure 3:
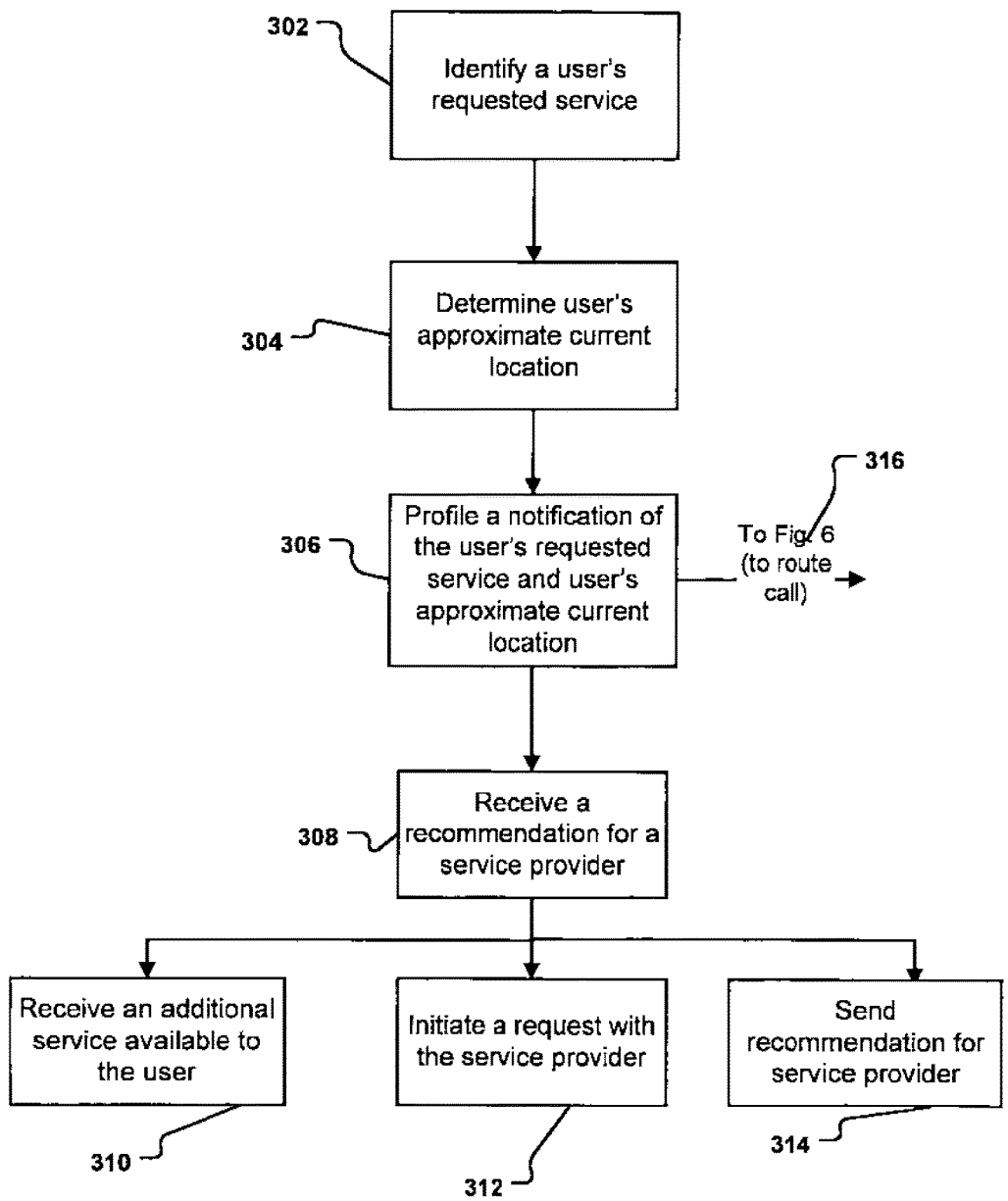
FIG. 3 depicts a method that identifies a requested service for a user, determines the user's approximate current location, and provides a notification with this information.

FIG. 3 depicts a method of an entity that identifies a requested service for a user, determines the user's approximate current location, and provides a notification with this information. For example, a service provider 155 that provides customer support for a user or requests services on behalf of the user may seek a service provider to fulfill the user's request that is in the best interest of the user. If the service is one that may be covered by insurance, it is in the interest of the user to verify that the service is indeed covered by the user's insurance policy and further seek a service provider in proximity to the user that can provide the service.

At 302, an entity such as a service provider 155 may identify a user's requested service. At 304, the entity may determine the user's approximate current location. For example, the service provider 155 may communicate with a device associated with the user, where the device is capable of communicating with location based technology. In order to fulfill the requested service, the service provider 155 may communicate with a third party to ensure that the service requested is covered by the user's insurance policy. At 306, the service provider 155 may provide a notification of the user's requested service and the user's approximate current location to a third party. The third party may be the insured's insurance provider or another entity that has knowledge of the user's insurance coverage. For example, the service provider 155 may access a user database 115 that is managed by a representative of the user and provides the user's insurance coverage. Based on the notification of the requested service at 306 and the user's approximate current location at 304, a call to the insurance provider may be routed for more efficient processing of the request at 316. The routing of a call is described in more detail with respect to FIG. 6.

At 308, the service provider 155 may receive a recommendation for a service provider as a result of the notification provided at 306. The service provider may be a preferred service provider that provides the user with additional benefits, such as discounted rates. The recommendation may include a service provider and information about the service provider, and may receive additional services available to the user under the user's insurance at 310. At 312, the service provider 155 may initiate a request for the service from a service provider. At 314, the service provider 155 may send the recommendation for the service provider to the user or other third party. For example, the service provider 155 may send the recommendation received for the service provider to the user so that the user can decide to use the service provider or not.

Figure 4:
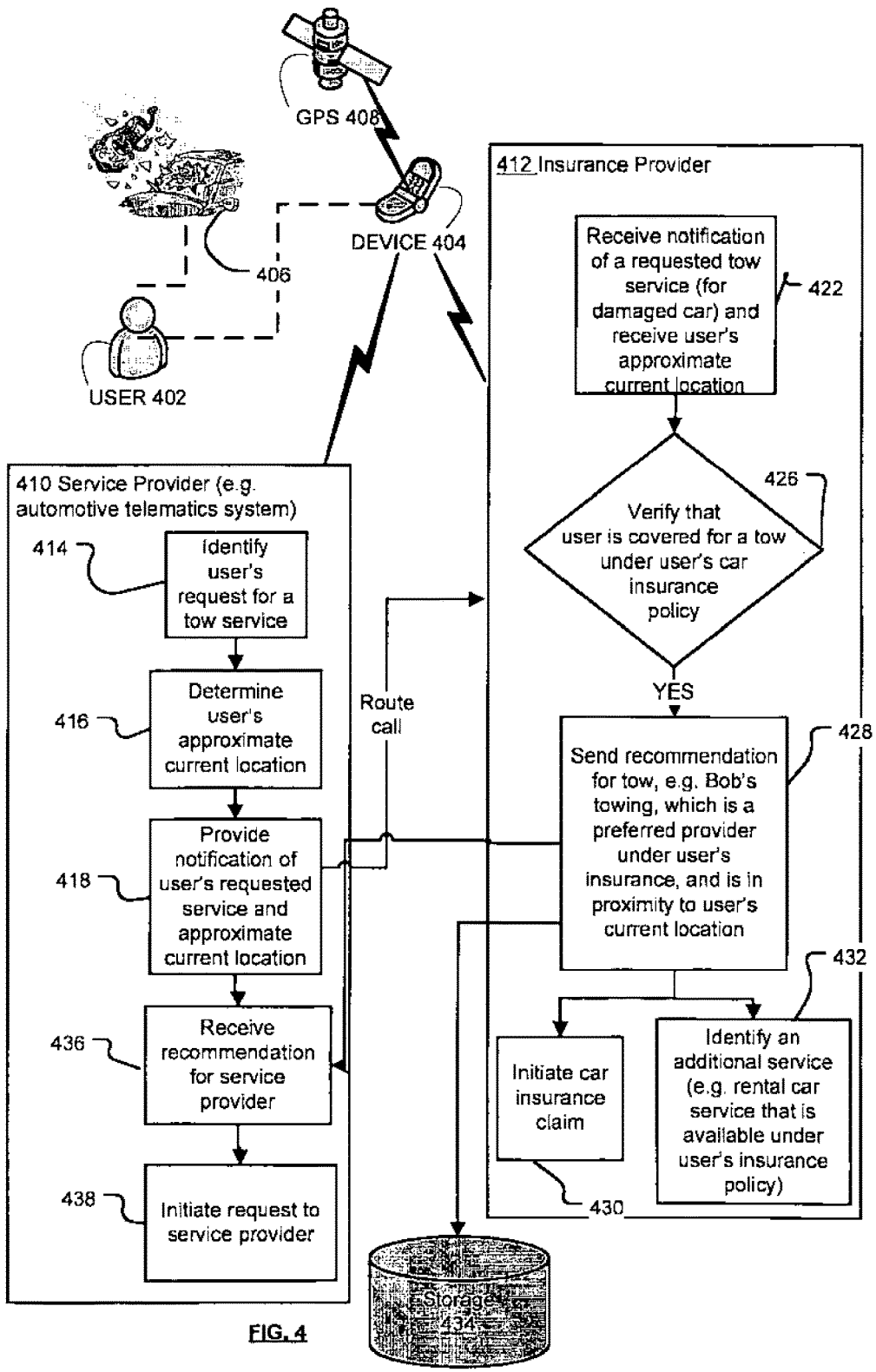
FIG. 4 depicts an example user utilizing the techniques disclosed herein.

FIG. 4 depicts an example user 402 that has a need for a towing service following a car accident. FIG. 4 illustrates the methods of FIG. 1 and FIG. 2 provided by an insurance provider 412 and a service provider 410, respectively. However, the same entity may perform both methods. For purposes of this example, the example service provider 155 is an automotive telematics system that communicates with a sensor on the vehicle 406.

A device 404 is associated with the user 402. The device has the ability to communicate with location-based technology 408, shown as GPS 408. Alternately, a sensor on the vehicle 406, programmed to indicate a status of the car to the service provider 410, may have the ability to communicate with location-based technology 408. The sensor on the vehicle 406 may notify the service provider 410 that the car is in an accident and communicate the vehicle 406's position with a service provider 410. Alternately, the device 404 may provide the request for service along with the user's approximate current location. At 414, the automotive telematics system identifies the user's request for a tow service and determines the user's approximate current location at 416 by requesting the information from the vehicle 406 or device 404. At 418, the automotive telematics system provides a notification of the user's requested service and the user's approximate current location to an insurance provider 412.

The insurance provider may utilize a call routing procedure to more efficiently process the request from the service provider 410. The method of routing the call is more sufficiently described with respect to FIG. 6.

At 422, the insurance provider receives the notification that the user has requested a tow service for the user's damaged vehicle 406. With the notification is the user's approximate current location. Alternately, the insurance provider could utilize location-based technology to determine the user's approximate current location. At 426, the insurance provider verifies that the user is covered for a towing service under the user's car insurance policy. If it is covered, the insurance provider may further determine if there are any preferred service providers, for example, that offer discounted rates to the insurance provider's clients. The insurance provider may then send a recommendation at 428 for a towing service that is in proximity to the user's approximate current location. The insurance provider may send the recommendation from 428 back to the service provider 410 who provided the initial notification regarding the user's requested service. The insurance provider may also store the information in storage 434, which may be a user database 115.

Further, at 432 the insurance provider may identify additional services that may be covered by the user's car insurance policy. For example, the insurance provider may provide an indication to the user that a rental car is also available under the user's car insurance policy. At 430, the insurance company may initiate a claim based on the accident.

The service provider 410 receives the recommendation for the service provider at 436. If the insurance provider has not already initiated a request to the service provider, the service provider 410 may initiate the request at 438. Further, the service provider 410 may provide the recommendation to the user and let the user make the decision whether to use the recommended service provider.

Thus, the collaboration of the components of system 100, shown in FIG. 4, may operate to provide a user with a recommended service provider that is recommended based on both the user's insurance coverage and the user's approximate current location. A service provider 410 such as that described may utilize the verification by an insurance provider or the like to provide better service to its clients.

Figure 5:
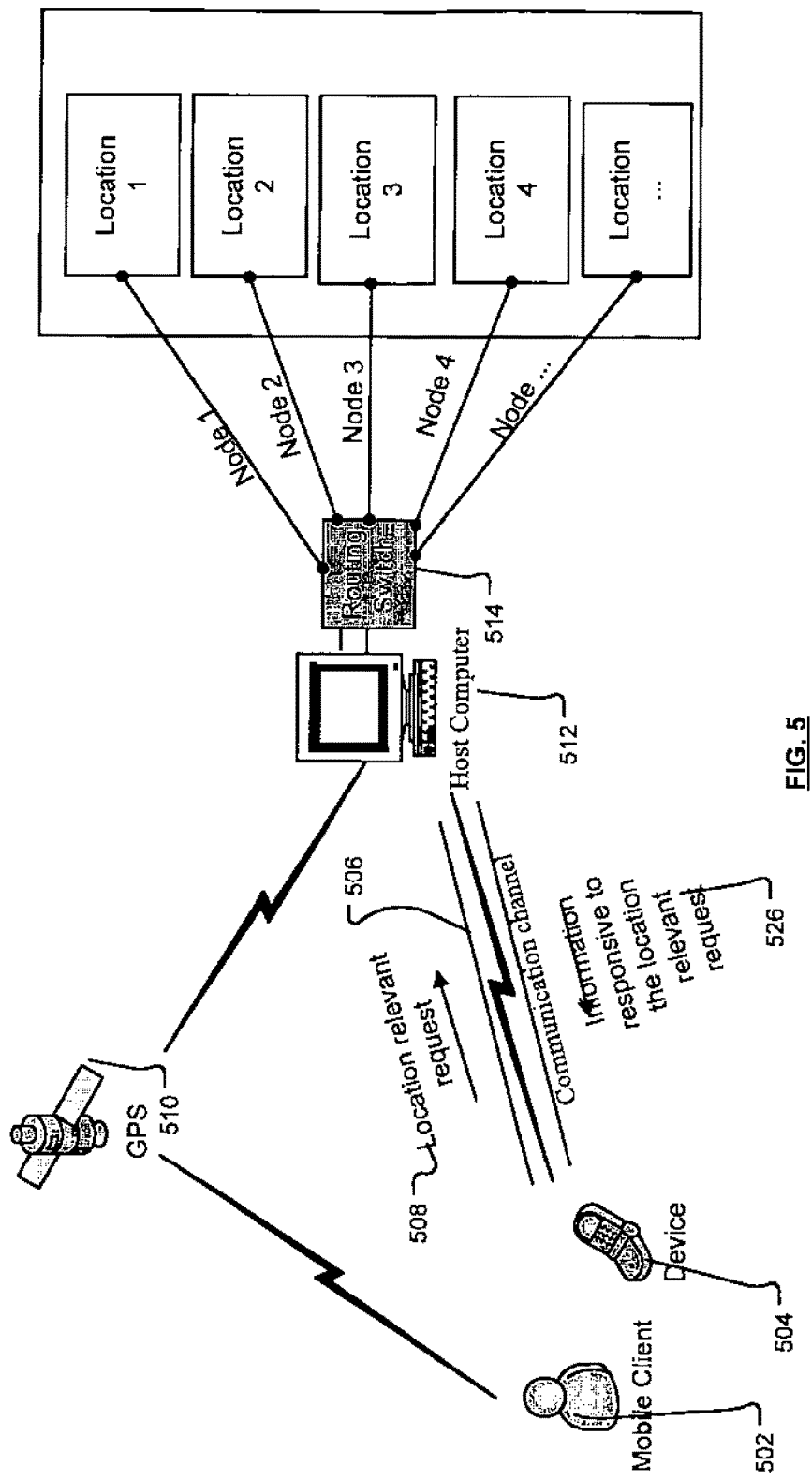
FIG. 5 illustrates an example system for routing a call based on a user's approximate current location.

FIG. 5 illustrates an example system for routing a call based on a user's approximate current location. The call routing technique illustrated in FIG. 5 is referenced by the method depicted in both FIG. 2 and FIG. 3. The user may be a mobile client 502 utilizing a mobile device 504 that is associated with the user 502. A mobile device 504, such as a cell phone, does not necessarily provide a user's location because the ANI is not associated with the user's mobile location. Thus, a host that receives a call from the user may not know the user's location. Because it may be desirable to route a call from a user to an appropriate terminal point based on the user's approximate current location, the host may determine the user's approximate current location via location-based technology (e.g., GPS 510).

An entity may host a plurality of nodes, such as a plurality of destinations for a call. The destinations may each be a representative of the hosted service, for example. The entity may have a communications channel accessible via a call made or a phone number dialed, for example, to reach a host with multiple nodes. The communications channel may be a single, dedicated channel with access to multiple nodes. For example, a user may dial one toll-free number and access an entity, wherein the entity has a plurality of nodes that are each specific to a particular function or geographic location.

The host 512, such as a host computer, may receive a call with a location-relevant request 508 over the communication channel 506. The host may utilize a routing switch to route the call to one of any number of nodes. The example nodes 1, 2, 3, 4, etc. in FIG. 5 are distinct based on location, such as locations 1, 2, 3, 4, etc. Thus, the routing switch 514 may direct the call to the appropriate node 1, 2, 3, 4, etc. based on the user's approximate current location, where the node location corresponds to the user's approximate current location.

For example, the host 512 may be an insurance provider and the insurance provider may provide a switching system, such as the routing switch 514. Similar switching systems may be used with automatic call distribution functionality. A mobile client 502 may call a toll-free number to access the insurance provider, and thus multiple nodes, over a communication channel. The user's approximate current location is determined via location-based technology and the routing switch may route the call based on the user's approximate current location. The insurance provider may also determine the relevance of the call to determine the appropriate node to which to route the call. Thus, a node may be distinct based both on the category and the location of the caller. For example, node 1 could be a car insurance division of an insurance provider based out of a particular location. If the user is calling for car insurance, and the user's approximate current location corresponds to location 1, then the user's call may be routed by the routing switch to node 1, for example. The user 502 may then have direct access to node 1, whether it be an operator or other form of access to information responsive to the location-relevant information 526.

Figure 6:
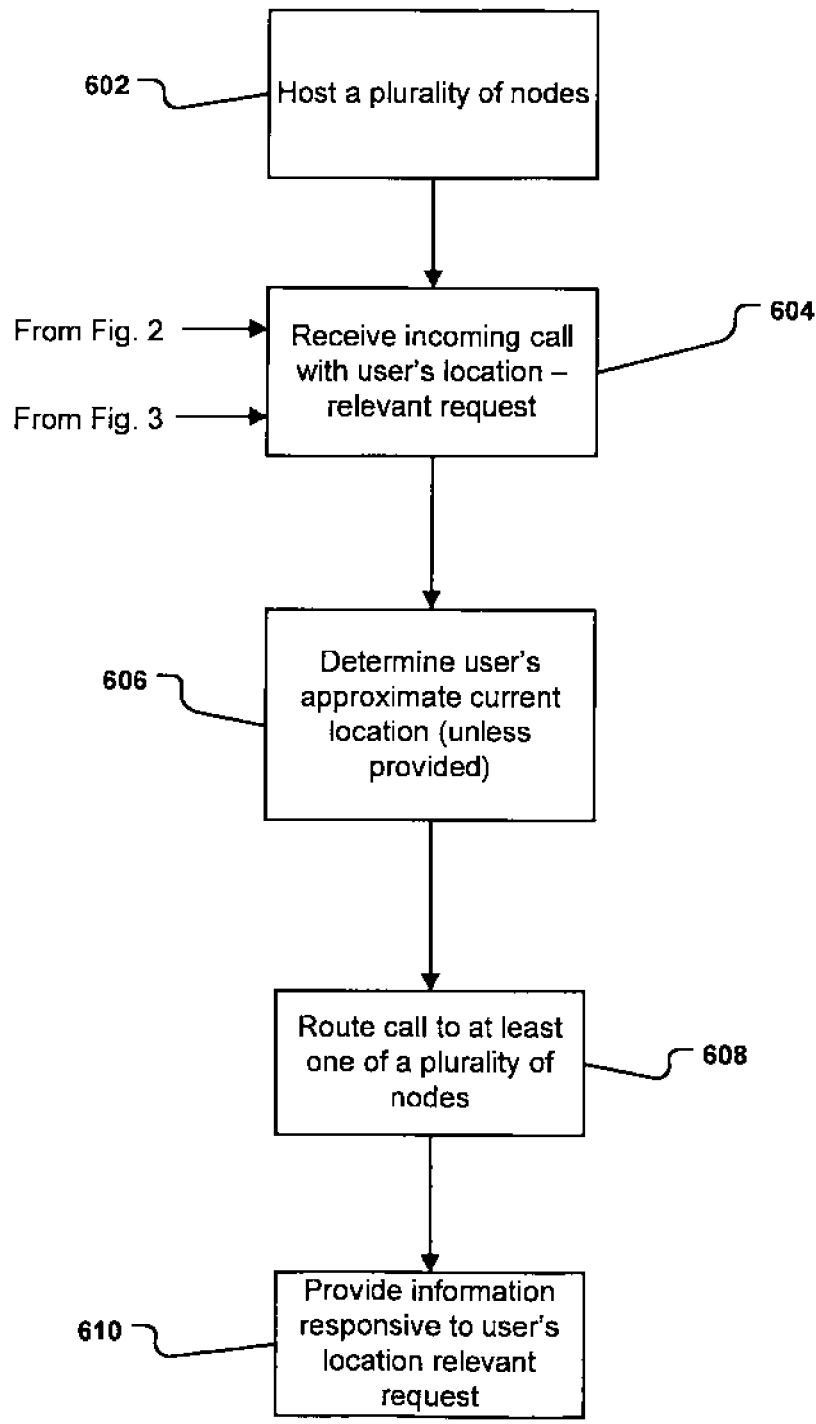
FIG. 6 depicts a method of routing a call based on a user's location-relevant request and the user's approximate current location.

Thus, referring back to FIG. 4, if the service provider 410 provided a notification of a user's requested service and the user's approximate current location, the call may be routed by the system depicted in FIG. 5. The method of routing a call based on a user's location-relevant request and the user's approximate current location is depicted in FIG. 6. At 602, an entity such as an insurance provider may host a plurality of nodes. Each node may be a representative specific to different categories of services provided by the entity. For example, the host 512 may be any service provider such as an insurance provider, an entertainment service, health care providers, or weather provider, for example. A user 502 may call the host 512 and request location-relevant information regarding locally released movies or request a local health care provider that is covered under the user's insurance policy.

At 604, the entity may receive an incoming call with a user's location-relevant request. At 606, the host may determine the user's approximate current location to determine where to route the incoming call at 608. The routing switch at the host server may route the call to one of multiple nodes. The call may thus reach the desired destination more efficiently. The user does not have to specify the user's location and the host handling the call can automatically determine the user's approximate current location. The selected node may then return information responsive to the user's location relevant request at 610.

Figure 7:
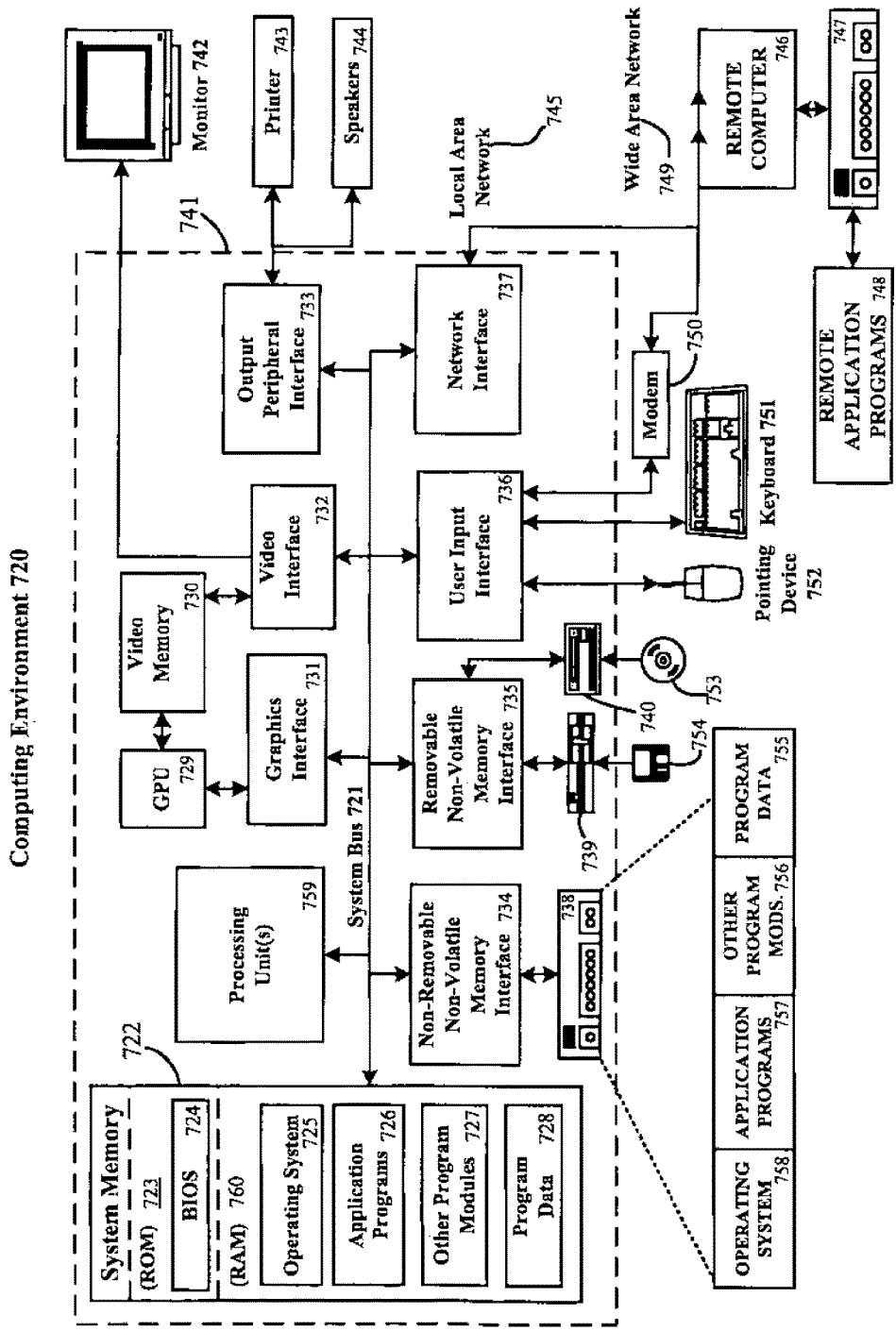
FIG. 7 depicts a block diagram representing an exemplary computing device suitable for use in conjunction with implementing the systems and methods described above.

FIG. 7 depicts a block diagram representing an exemplary computing device suitable for use in conjunction with implementing the systems and methods described above. For example, the computer executable instructions that carry out the processes and methods described herein may reside and/or be executed in such a computing environment as shown in FIG. 7. The computing system environment 720 is only one example of a suitable computing environment and is not intended to suggest any limitation as to the scope of use or functionality of the presently disclosed subject matter. Neither should the computing environment 720 be interpreted as having any dependency or requirement relating to any one or combination of components illustrated in the exemplary operating environment 720.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 741. Components of computer 741 may include, but are not limited to, a processing unit 759, a system memory 722, and a system bus 721 that couples various system components including the system memory to the processing unit 759. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus. Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 741 typically includes a variety of computer readable media. Computer readable media can be any available media that can be accessed by computer 741 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 741. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF), infrared and other wireless media. Combinations of the any of the above should also be included within the scope of computer readable media.

The system memory 722 includes computer storage media in the form of volatile and/or nonvolatile memory such as read only memory (ROM) 723 and random access memory (RAM) 760. A basic input/output system 724 (BIOS), containing the basic routines that help to transfer information between elements within computer 741, such as during start-up, is typically stored in ROM 723. RAM 760 typically contains data and/or program modules that are immediately accessible to and/or presently being operated on by processing unit 759. By way of example, and not limitation, FIG. 7 illustrates operating system 725, application programs 726, other program modules 727, and program data 728.

The computer 741 may also include other removable/non-removable, volatile/nonvolatile computer storage media. By way of example only. FIG. 7 illustrates a hard disk drive 738 that reads from or writes to non-removable, nonvolatile magnetic media, a magnetic disk drive 739 that reads from or writes to a removable, nonvolatile magnetic disk 754, and an optical disk drive 740 that reads from or writes to a removable, nonvolatile optical disk 753 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 738 is typically connected to the system bus 721 through a non-removable memory interface such as interface 734, and magnetic disk drive 739 and optical disk drive 740 are typically connected to the system bus 721 by a removable memory interface, such as interface 735.

The drives and their associated computer storage media discussed above and illustrated in FIG. 7, provide storage of computer readable instructions, data structures, program modules and other data for the computer 741. In FIG. 7, for example, hard disk drive 738 is illustrated as storing operating system 758, application programs 757, other program modules 756, and program data 755. Note that these components can either be the same as or different from operating system 725, application programs 726, other program modules 727, and program data 728. Operating system 758, application programs 755, other program modules 756, and program data 757 are given different numbers here to illustrate that, at a minimum, they are different copies. A user may enter commands and information into the computer 741 through input devices such as a keyboard 751 and pointing device 752, commonly referred to as a mouse, trackball or touch pad. Other input devices (not shown) may include a microphone, joystick, game pad, satellite dish, scanner, or the like. These and other input devices are often connected to the processing unit 759 through a user input interface 736 that is coupled to the system bus, but may be connected by other interface and bus structures, such as a parallel port, game port or a universal serial bus (USB). A graphics interface 731 may also be connected to the system bus 721. One or more graphics processing units (GPUs) 729 may communicate with graphics interface 731. A monitor 742 or other type of display device is also connected to the system bus 721 via an interface, such as a video interface 732, which may in turn communicate with video memory 730. In addition to the monitor, computers may also include other peripheral output devices such as speakers 744 and printer 743, which may be connected through an output peripheral interface 733.

The computer 741 may operate in a networked environment using logical connections to one or more remote computers, such as a remote computer 746. The remote computer 746 may be a personal computer, a server, a router, a network PC, a peer device or other common network node, and typically includes many or all of the elements described above relative to the computer 741, although only a memory storage device 745 has been illustrated in FIG. 7. The logical connections depicted in FIG. 7 include a local area network (LAN) 745 and a wide area network (WAN) 749, but may also include other networks. Such networking environments are commonplace in offices, enterprise-wide computer networks, intranets and the Internet.

When used in a LAN networking environment, the computer 741 is connected to the LAN 745 through a network interface or adapter 737. When used in a WAN networking environment, the computer 741 typically includes a modem 750 or other means for establishing communications over the WAN 749, such as the Internet. The modem 750, which may be internal or external, may be connected to the system bus 721 via the user input interface 736, or other appropriate mechanism. In a networked environment, program modules depicted relative to the computer 741, or portions thereof, may be stored in the remote memory storage device. By way of example, and not limitation, FIG. 7 illustrates remote application programs 748 as residing on memory device 747. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and nonvolatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 8:
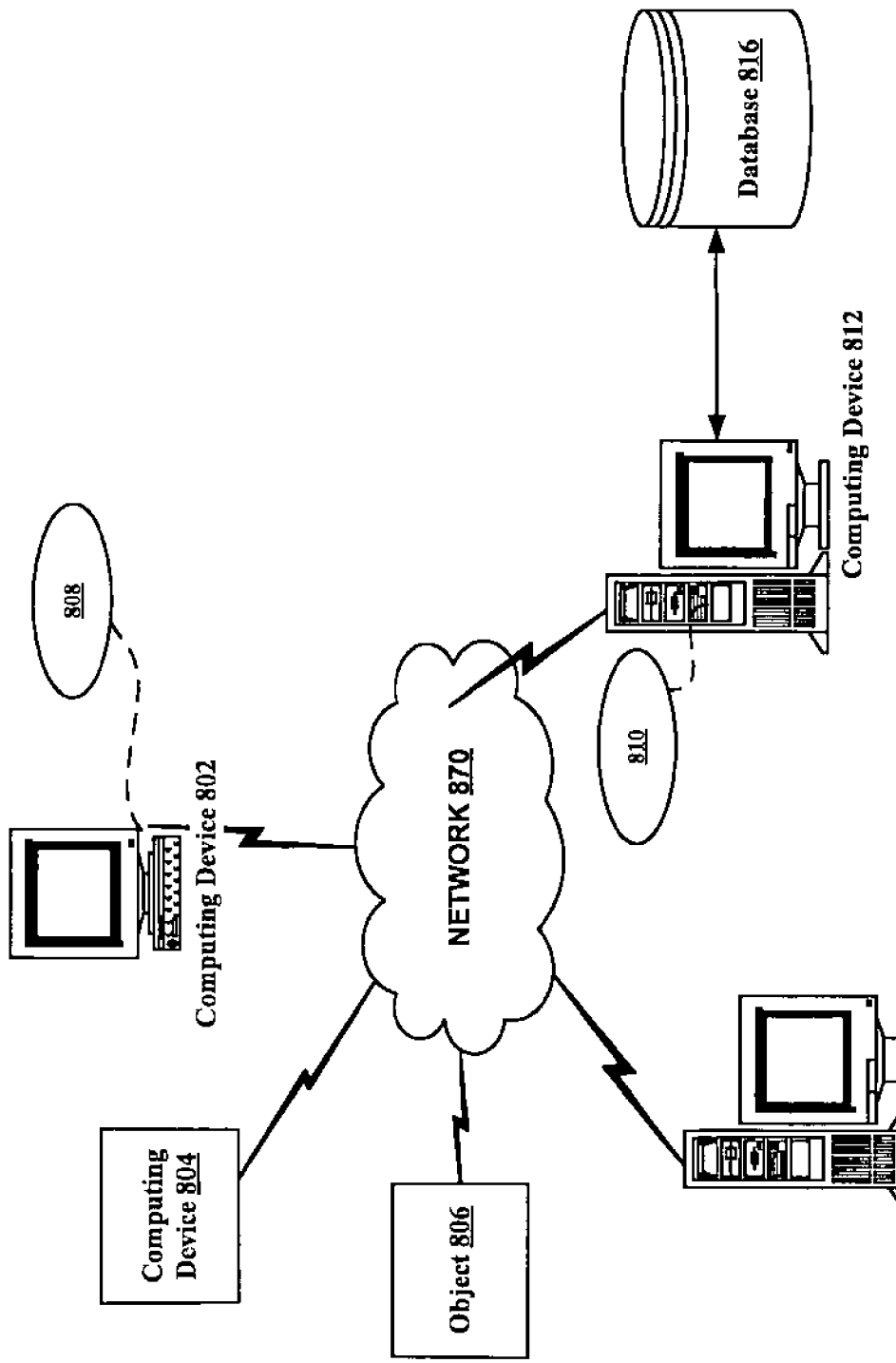
FIG. 8 provides a schematic diagram of an exemplary networked or distributed computing environment.

FIG. 8 depicts an exemplary networked computing environment in which many computerized processes may be implemented to perform the processes described above. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 8 provides a schematic diagram of an exemplary networked or distributed computing environment. The environment comprises computing devices 802, 804, 812, and 814 as well as objects 806, 808, and 810, and database 816. Each of these entities 802, 804, 806, 808, 810, 812, 814, and 816 may comprise or make use of programs, methods, data stores, programmable logic, etc. The entities 802, 804, 806, 808, 810, 812, 814, and 816 may span portions of the same or different devices such as PDAs, audio/video devices, MP3 players, personal computers, etc. Each entity 802, 804, 806, 808, 810, 812, 814, and 816 can communicate with another entity 802, 804, 806, 808, 810, 812, 814, and 816 by way of the communications network 870. In this regard, any entity may be responsible for the maintenance and updating of a database 816 or other storage element.

This network 870 represents multiple interconnected networks. In accordance with an aspect of the presently disclosed subject matter, each entity 802, 804, 806, 808, 810, 812, 814, and 816 may contain discrete functional program modules that might make use of an API, or other object, software, firmware and/or hardware, to request services of one or more of the other entities 802, 804, 806, 808, 810, 812, 814, and 816.

It can also be appreciated that an object, such as 810, may be hosted on another computing device 812. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer. e.g., a server. In the example of FIG. 7, any entity 802, 804, 806, 808, 810, 812, 814, and 816 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 8 and the further diversification that can occur in computing in a network environment such as that of FIG. 8, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, handheld devices, supercomputers, or computers integrated into other systems.

As is apparent from the above, all or portions of the various systems, methods, and aspects of the present embodiments may be embodied in hardware, software, or a combination of both. It is noted that the foregoing examples have been provided merely for the purpose of explanation and are in no way to be construed as limiting. While the embodiments have been described with reference to various embodiments, it is understood that the words which have been used herein are words of description and illustration, rather than words of limitation. Further, although the embodiments been described herein with reference to particular means, materials, the embodiments are not intended to be limited to the particulars disclosed herein; rather, the embodiment extends to all functionally equivalent structures, methods and uses, such as are within the scope of the appended claims.

What is claimed:

1. A computer-implemented method comprising:
   receiving, by a computer from a user device integrated in a vehicle, a notification indicating a user is requesting one or more services associated with the user, according to a database indicating the one or more services associated with each respective user;
   receiving, by the computer, a geo-location indicator identifying a location of the user device;
   identifying, by the computer from the database, one or more data records corresponding to the user;
   when the one or more services requested by the user are consistent with the one or more data records corresponding to the user:
   identifying, by the computer, a service provider for each of the one or more services in proximity to the vehicle's approximate current location; and
   upon receiving a call from a mobile device, routing, by the computer, the call from the mobile device to a call-center representative based on the notification of each requested service that is consistent with the one or more data records corresponding to the user and the user's approximate current location, wherein the computer identifies that the mobile device is associated with the user based on an identifier of the mobile device of the user; and
   transmitting, by the computer, a second notification to the mobile device containing a recommendation for each service provider within proximity to the vehicle.

2. The method of claim 1, wherein the computer is managed by an insurance provider.

3. The method of claim 2, further comprising, initiating, by the computer, an insurance claim.

4. The method of claim 1, wherein the second notification includes a recommendation to a preferred service provider that provides the user with savings for the service.

5. The method of claim 1, further comprising initiating, by the computer, a request with one of the service providers.

6. The method of claim 1, wherein a service from the one or more services is covered by an insurance policy.

7. A computing system comprising:
   a coverage provider server comprising a processor configured to:

receive, from a user device integrated in a vehicle, a notification indicating a user is requesting one or more services associated with the user, according to a database indicating the one or more services associated with each respective user;

receive a geo-location indicator identifying a location of the user device;

identifying, from the database, one or more data records corresponding to the user;

when the one or more services requested by the user are consistent with the one or more data records corresponding to the user:

identify a service provider for each of the one or more services in proximity to the vehicle's approximate current location; and transmit a second notification containing a recommendation for each service provider within proximity to the vehicle to the user device; and a call routing device configured to, upon the computer determining that each service provider of the service is associated with the user:

route a call from a mobile device to a call-center representative based on the notification of each requested service that is consistent with the one or more data records corresponding to the user and the vehicle's approximate current location, wherein the computer identifies that the mobile device is associated with the user based on an identifier of the mobile device matching the user.

8. The system of claim 7, wherein the coverage provider server is managed by an insurance provider.

9. The system of claim 8, wherein the processor is further configured to initiate an insurance claim.

10. The system of claim 7, further comprising initiating, by the coverage provider server, a request with one of the service providers.

11. The system of claim 7, wherein the second notification includes a recommendation to a preferred service provider that provides the user with savings for the service.

12. The system of claim 7, wherein a service from the one or more services is covered by an insurance policy.

13. A non-transitory computer-readable storage medium comprising computer-readable instructions for performing a computer-implemented method, the computer-readable instructions comprising instructions for:

receiving, by a computer, from a user device integrated in a vehicle, a notification indicating a user is requesting one or more services associated with the user, according to a database indicating the one or more services associated with each respective user;

receiving, by the computer, a geo-location indicator identifying a location of the user device;

identifying, by the computer from the database, one or more data records corresponding to the user;

when the one or more services requested by the user are consistent with the one or more data records corresponding to the user:

identifying, by the computer, a service provider for each of the one or more services in proximity to the user's approximate current location; and upon receiving a call from a mobile device, routing, by the computer, the call from the mobile device to a call-center representative based on the notification of each requested service that is consistent with the one or more data records corresponding to the user and the vehicle's approximate current location, wherein the computer identifies that the mobile device is associated with the user based on an identifier of the mobile device matching the user; and transmitting, by the computer, a second notification to the mobile device containing a recommendation for each service provider within proximity to the vehicle.

14. The computer-readable storage medium of claim 13, wherein the computer is managed by an insurance provider.

15. The computer-readable storage medium of claim 14, further comprising, instructions for initiating, by the computer, an insurance claim.

16. The computer-readable storage medium of claim 13, further comprising instructions for initiating, by the computer, a request with one of the service providers.

17. The computer-readable storage medium of claim 13, wherein the second notification includes a recommendation to a preferred service provider that provides the user with savings for the service.

18. The computer-readable storage medium of claim 13, wherein a service from the one or more services is covered by an insurance policy.

* * * * *